US011462097B2

(12) United States Patent
Rozendaal et al.

(10) Patent No.: US 11,462,097 B2
(45) Date of Patent: Oct. 4, 2022

(54) ILLUMINATION CONTROL (71) Applicant: SIGNIFY HOLDING B.V., Eindhoven (NL)

(72) Inventors: Leendert Teunis Rozendaal, Eindhoven (NL); Berent Willem Meerbeek, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/317,589

(22) PCT Filed: Jul. 5, 2017

(86) PCT No.: PCT/EP2017/066798
§ 371 (c)(1),
(2) Date: Jan. 14, 2019

(87) PCT Pub. No.: WO2018/011036
PCT Pub. Date: Jan. 18, 2018

(65) Prior Publication Data
US 2019/0289698 A1    Sep. 19, 2019

(30) Foreign Application Priority Data
Jul. 14, 2016  (EP) .................................... 16179410

(51) Int. Cl.
*G08C 17/02* (2006.01)
*H05B 47/175* (2020.01)
(Continued)

(52) U.S. Cl.
CPC ........... *G08C 17/02* (2013.01); *H05B 47/105* (2020.01); *H05B 47/11* (2020.01); *H05B 47/115* (2020.01);
(Continued)

(58) Field of Classification Search
CPC .... H05B 47/175; H05B 47/155; H05B 45/10; H05B 45/105; H05B 45/115; H05B 39/00; H05B 47/11; H05B 47/105; G08C 17/02
See application file for complete search history.

(56) References Cited

U.S. PATENT DOCUMENTS 5,293,097 A * 3/1994 Elwell ................. H05B 47/105
315/154
5,430,356 A * 7/1995 Ference ................ H05B 39/08
315/291
(Continued)

FOREIGN PATENT DOCUMENTS

JP  H11238579 A    8/1999
JP  2012-243516 A * 12/2012 ............. H05B 37/02
(Continued)

OTHER PUBLICATIONS

JP 2012-243516 A, Machine Translation provideed (Date Dec. 2012 Name: Hirowatari Y.*

*Primary Examiner* — Abdullah A Riyami
*Assistant Examiner* — Syed M Kaiser (57)    ABSTRACT

A method and apparatus for controlling lighting settings in a lighting system in which a memory stores a previous lighting setting. A change of light settings, caused by a trigger event can be reversed, to return to the setting stored in memory, by a corrective user input, providing an undo function. The initial change caused by a trigger event may be an automated change without user input, in response to information provided by a sensor, such as a motion sensor or ambient light sensor, or by a clock for example. The time period between the change of lighting settings and the corrective input may be determined, and restoring the first light setting may be dependent on said corrective input being
(Continued)

received within a set time period from the change from the first light setting to the second light setting.

14 Claims, 4 Drawing Sheets

(51) Int. Cl.
  *H05B 47/155* (2020.01)
  *H05B 47/105* (2020.01)
  *H05B 47/11* (2020.01)
  *H05B 47/115* (2020.01)
(52) U.S. Cl.
  CPC ......... *H05B 47/155* (2020.01); *H05B 47/175* (2020.01)

(56) References Cited

U.S. PATENT DOCUMENTS

| | | | |
|---|---|---|---|
| 6,169,377 B1 | 1/2001 | Bryde et al. | |
| 6,597,133 B2 * | 7/2003 | Hudson | H05B 47/16 315/360 |
| 8,049,599 B2 | 11/2011 | Sutardja | H05B 39/044 340/12.33 |
| 8,832,574 B2 * | 9/2014 | Ostergard | G06F 3/016 715/768 |
| 9,699,874 B2 * | 7/2017 | Phillips | H05B 47/105 |
| 9,907,147 B2 * | 2/2018 | Chen | F21V 14/06 |
| 10,051,716 B2 * | 8/2018 | Newton | G08C 17/02 |
| 10,159,137 B2 * | 12/2018 | Bedell | H05B 47/11 |
| 2005/0024255 A1 * | 2/2005 | Chuey | G08C 19/28 341/176 |
| 2005/0030152 A1 * | 2/2005 | Cooper | G08C 23/04 340/5.22 |
| 2007/0250920 A1 * | 10/2007 | Lindsay | G07F 7/1025 726/7 |
| 2008/0256630 A1 * | 10/2008 | Fujikawa | H04N 1/00411 726/21 |
| 2010/0090619 A1 * | 4/2010 | Adamson | H05B 45/20 315/312 |
| 2010/0277270 A1 * | 11/2010 | Aikens | G05B 19/042 340/3.7 |
| 2010/0331650 A1 * | 12/2010 | Batman | A61B 5/14532 600/365 |
| 2011/0236049 A1 * | 9/2011 | Haga | G03G 15/5004 399/75 |
| 2011/0312278 A1 * | 12/2011 | Matsushita | G08C 17/02 455/66.1 |
| 2012/0026726 A1 * | 2/2012 | Recker | H05B 47/19 362/157 |
| 2012/0080944 A1 * | 4/2012 | Recker | H05B 45/20 307/25 |
| 2012/0215366 A1 * | 8/2012 | Redmond | G05B 19/042 700/284 |
| 2012/0235579 A1 * | 9/2012 | Chemel | H05B 45/10 315/152 |
| 2013/0063042 A1 * | 3/2013 | Bora | H05B 47/16 315/292 |
| 2014/0067130 A1 * | 3/2014 | Pillai | A61L 2/00 700/275 |
| 2014/0186026 A1 * | 7/2014 | Oshima | H04B 10/116 398/25 |
| 2014/0207282 A1 * | 7/2014 | Angle | G05B 15/02 700/257 |
| 2014/0247147 A1 * | 9/2014 | Proud | H04W 4/70 340/870.02 |
| 2014/0282007 A1 * | 9/2014 | Fleizach | G06F 3/0487 715/728 |
| 2014/0292208 A1 * | 10/2014 | Chemel | H05B 47/16 315/154 |
| 2015/0051826 A1 * | 2/2015 | Basson | G01C 21/3697 701/437 |
| 2015/0084853 A1 * | 3/2015 | Li | G06F 3/03542 345/156 |
| 2015/0120205 A1 * | 4/2015 | Jeon | A61B 5/015 702/19 |
| 2015/0163715 A1 * | 6/2015 | Das | H04W 36/22 455/436 |
| 2015/0282282 A1 * | 10/2015 | Breuer | H04M 1/72533 315/152 |
| 2016/0018257 A1 * | 1/2016 | Mirov | A61B 5/6824 600/479 |
| 2016/0091217 A1 * | 3/2016 | Verberkt | F24F 11/30 700/276 |
| 2016/0116961 A1 * | 4/2016 | Kunnathur Ragupathi | G06F 1/32 713/320 |
| 2016/0188181 A1 * | 6/2016 | Smith | G06F 3/044 715/765 |
| 2016/0189387 A1 * | 6/2016 | Kannan | G01B 11/2545 382/106 |
| 2016/0189532 A1 * | 6/2016 | Malhotra | G08B 25/008 340/506 |
| 2016/0227634 A1 * | 8/2016 | Engelen | G05D 1/0234 |
| 2016/0323972 A1 * | 11/2016 | Bora | F21V 7/00 |
| 2016/0338173 A1 * | 11/2016 | Knaapen | H05B 47/18 |
| 2017/0108236 A1 * | 4/2017 | Guan | H05B 47/11 |
| 2017/0237488 A1 * | 8/2017 | Aoyama | H04M 11/00 398/118 |
| 2018/0228003 A1 * | 8/2018 | O'Driscoll | G06F 3/03547 |
| 2019/0029096 A1 * | 1/2019 | O'Driscoll | H04L 12/2827 |

FOREIGN PATENT DOCUMENTS

| | | | | |
|---|---|---|---|---|
| WO | WO2015104211 A1 | 7/2015 | | |
| WO | WO-2016179377 A1 * | 12/2017 | | H04Q 9/02 |

* cited by examiner

| Luminaire | Scene X | | | | |
| --- | --- | --- | --- | --- | --- |
| | 1 | 2 | 3 | 4 | 5 |
| Brightness | 24 | 24 | - | 16 | - |
| Colour | 122 | 248 | - | 122 | - |
| Effect | - | - | - | - | - |

ILLUMINATION CONTROL

CROSS-REFERENCE TO PRIOR APPLICATIONS

This application is the U.S. National Phase application under 35 U.S.C. § 371 of International Application No. PCT/EP2017/066798, filed on Jul. 5, 2017, which claims the benefit of European Patent Application No. 16179410.2, filed on Jul. 14, 2016. These applications are hereby incorporated by reference herein.

TECHNICAL FIELD

The present disclosure relates to control and storage of illumination information in an illumination system.

BACKGROUND

"Connected lighting" refers to a system of luminaires which are controlled not by (or not only by) a traditional wired, electrical on-off or dimmer circuit, but rather via a wired or more often wireless network using a digital communication protocol. Typically, each of a plurality of luminaires, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol).

Luminaires may have individually controllable parameters, such as brightness and color, and one or more luminaires may be controlled together in a group in a coordinated manner to create an overall light distribution, or scene, for illuminating an area or space such as room in a desired manner. Combinations of different luminaires and/or different settings of the luminaires can achieve a different overall illumination of the area of space, as desired.

Rather than having to control individual luminaires, or even individual settings for each luminaire, in order to achieve a desired illumination, it is usually preferable for groups of settings to be stored together corresponding to a desired light distribution, or scene. For example a "morning" scene, or a "relaxing" scene can be created, and it will be understood that a large number of lighting options quickly become available.

SUMMARY

In order to improve manageability and convenience for end users, automation or semi-automation is increasingly employed to control illumination in a lighting system such as a connected lighting system as described above. Routines and schedules can be learned and programmed, and sensors and other inputs contribute to predict and adapt illumination to a user's wants and needs. However it is difficult to anticipate the lighting needs of a user correctly all of the time, and in some circumstances a lighting system can change to a setting a scene that is undesirable to a user. The system decision is based on a limited set of conditions, and while it may make correct judgements in the majority of cases, may still be "wrong" in the user's perception in some cases.

It would be desirable to provide improved illumination control.

According to a first aspect of the present invention, there is provided a lighting control system comprising a controller for controlling one or more lighting devices (204,404,504) for providing illumination of a space; and a memory for storing at least a first light setting for said one or more lighting devices; wherein the controller is adapted to cause an automatic change from the first light setting to a second light setting in response to a detected trigger event, and wherein the controller is further adapted to restore the first light setting, having been stored in the memory, in response to a corrective user input.

In this way, a user can quickly and easily revert to a previous light setting in the case that a "wrong" setting occurs. A user need not change from the undesired setting using the standard control process or method of lighting control, but has a direct short cut to whatever setting immediately preceded the undesired current setting. This is particularly useful in a case where the change from a first setting to a second setting is triggered without user input. This refers to cases where a specific instruction intended to change light setting, such as input to a dedicated lighting user interface or switch or wall panel has not been input by a user. Actions such as walking past a motion sensor, or posting a Facebook message (which can be linked to a trigger event) necessarily involve a user, but are not considered as a dedicated user input. Such a trigger is more likely to be unexpected, and therefore an option to reverse such an automated change is advantageous in embodiments.

A time limit may be put on the correction back to the previous setting in embodiments. Accordingly, the controller may be adapted to restore the first light setting only if the corrective input is made or received within a set time period from the change from the first light setting to the second light setting. Typically a corrective input to "undo" a change will be provided shortly after such a change. For example a time period of approximately 5 seconds, 10 seconds or 30 seconds may be appropriate for a user to recognize the change is unwanted or inappropriate, and be able to provide an input. This may prevent accidentally reverting to a setting from a long time ago.

In embodiments the length of the time period can vary, and need not be the same for different types of trigger events, light settings, and the manner of the corrective user input. For example, a change triggered by a movement sensor may have a shorter period for and undo action, based on an assumption that a user will be able to access a wall switch or panel quickly or easily in such a scenario, whereas a clock based trigger may allow a longer period as the change might occur while a user is seated for example. A corrective input in the form of a voice command may only be accepted for a short duration, as it can be provided quickly, while a corrective input to a wall switch may be accepted for a longer period, to allow a user time to reach the wall switch. The time and/or date may influence the time period, for example at night it might be assumed that a longer time is required to find a smartphone than in the daytime. Other system inputs and state knowledge may also be used to determine the time period or periods, for example the presence of a particular individual in a room or area, or the number of light events in a certain period.

In embodiments, a user input interface, adapted to accept the corrective user input, can have its function re-assigned for a period following an automatic change in light setting. That is, the controller can be adapted to restore the first light setting in response to a given input to said user input interface, for a certain time period following the change, but be adapted to perform a different lighting control function in response to the same input to said user interface outside of said set period.

The function of an interface or interfaces, and therefore user input device(s) acting as said interface, or via said interface, such as a wall switch or wall panel for example, or a switch attached or assigned to a lighting device, can therefore be changed in response to a change of light setting. Such devices may perform one function normally, but temporarily perform an "undo" function following a lighting change. In certain embodiments therefore, no dedicated undo input or interface is required, and other interfaces can be re-purposed for a set duration following a change. Input devices having different functions can all be switched to perform an undo function in examples, or only a subset can be switched. The period of time for which the function is switched may vary between devices or inputs.

As noted above the corrective user input can be an input to one or more lighting devices controlled by the system. This might be a switch on a device such as a table lamp, or a tap to a lamp in the case of a touch sensitive device.

In embodiments, the controller is adapted to register a corrective user input, and to update the response to a trigger event to change said light settings, based on a registered corrective user input.

In this way, the system can learn from corrective inputs, better to control the lighting device in future. For example control algorithms and/or settings for automation of the system, in response to triggers such as sensor inputs or a clock can be updated. Such updating may occur automatically, however the system may provide an output to a user indicating a possible or proposed update, and prompt a user to input whether or not to accept said update.

In embodiments, the system is adapted to determine the location of a user providing a corrective input, and wherein the response to the corrective input depends on the location of the user.

According to a further aspect of the invention, there is provided a method of controlling a lighting system including one or more lighting devices for providing illumination of a space, the method comprising detecting a trigger event and automatically switching said one or more lighting devices from a first lighting setting to a second lighting setting in response to said trigger event; detecting a corrective user input; and restoring said first lighting setting in response to said corrective user input.

Preferably the change from a first setting to a second setting is triggered without user input, for example an automated change based on sensor or clock inputs.

In embodiments, the method further comprises storing said first lighting setting in a memory.

In embodiments the method further comprises determining a time period between said trigger event and said corrective user input; and wherein restoring said first light setting is performed if it is determined that said time period is less than or equal to a predetermined threshold The method may further comprise reassigning a function of a user interface to correspond to said corrective user input. In other words, a user interface, such as a wall switch, or switch or input to a luminaire such as a table lamp which ordinarily performs one function (such as turning a light source on or off, or recalling a particular light setting) can have its function changed to act as an "undo" input or function temporarily. This may apply also to a user interface associated with a mobile user device acting as a controller, such as a smartphone. An input such as shaking the phone, or a swipe movement may have a default function associated, but may act to provide an undo function for a period immediately following a change from the first to the second setting. The reassignment can occur for a set duration from the time of switching said one or more lighting devices to said second lighting setting. The previous or original function of the user interface can be restored after the end of the set duration.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings.

Any feature in one aspect of the invention may be applied to other aspects of the invention, in any appropriate combination. In particular, features of method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which.

DETAILED DESCRIPTION OF EMBODIMENTS

Figure 1:
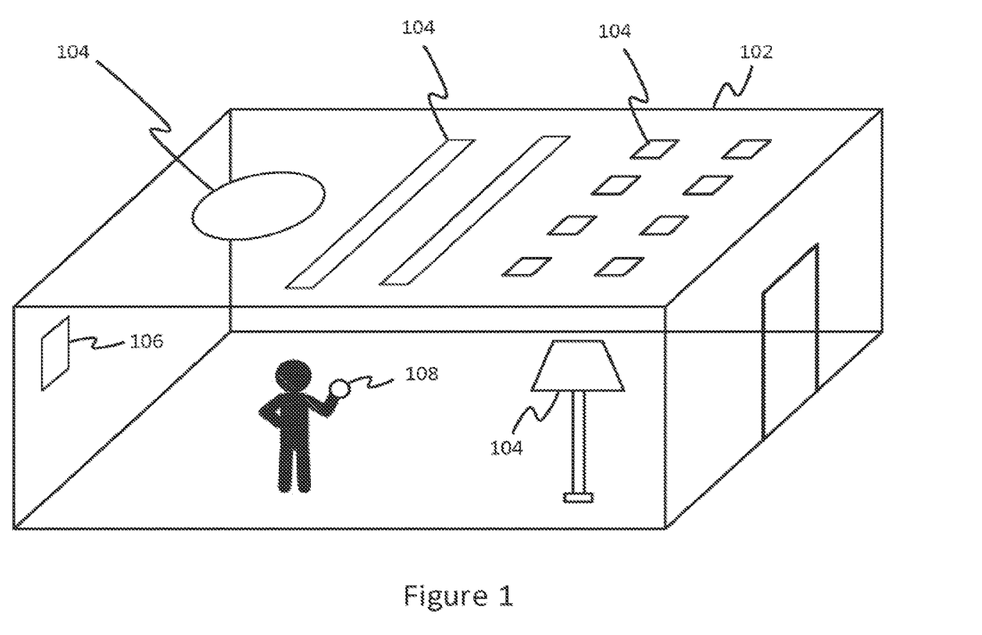
FIG. 1 shows an example of a lighting system installation.

FIG. 1 shows a lighting system installed or otherwise disposed in an environment 102, e.g. an indoor space such as a room, or an outdoor space such as a garden or park, or a partially covered space such as a gazebo, or any other space that can be occupied by one or more people such as the interior of a vehicle. The lighting system comprises one or typically a plurality of luminaires 104, each comprising one or more lamps (illumination emitting elements) and any associated housing, socket(s) and/or support. LEDs may be used as illumination emitting elements, but other alternatives such as incandescent lamps e.g. halogen lamps. A luminaire 104 is a lighting device for emitting illumination on a scale suitable for illuminating an environment 102 occupiable by a user. For example, a luminaire 104 may be a ceiling mounted luminaire, such as a spotlight or wall washer, a wall mounted luminaire, or a free standing luminaire such as a floor lamp or desk lamp for example (and each need not necessarily be of the same type).

A user can control the lighting system via a user terminal such as a wall panel 106. Alternatively or additionally a mobile user terminal 108 may be provided in order to allow the user to control the lighting system. This will typically be in the form of a smartphone, watch or tablet for example, running an application or "app". The user terminal or terminals comprise a user interface such as a touchscreen or a point-and-click interface arranged to enable a user (e.g. a user present in the environment 102, or located remotely in the case of a mobile terminal) to provide user inputs to the lighting control application. A user may also be able to control individual luminaires, or a system of connected luminaires by interfacing directly with the luminaire e.g. in the case of a table lamp.

Figure 2:
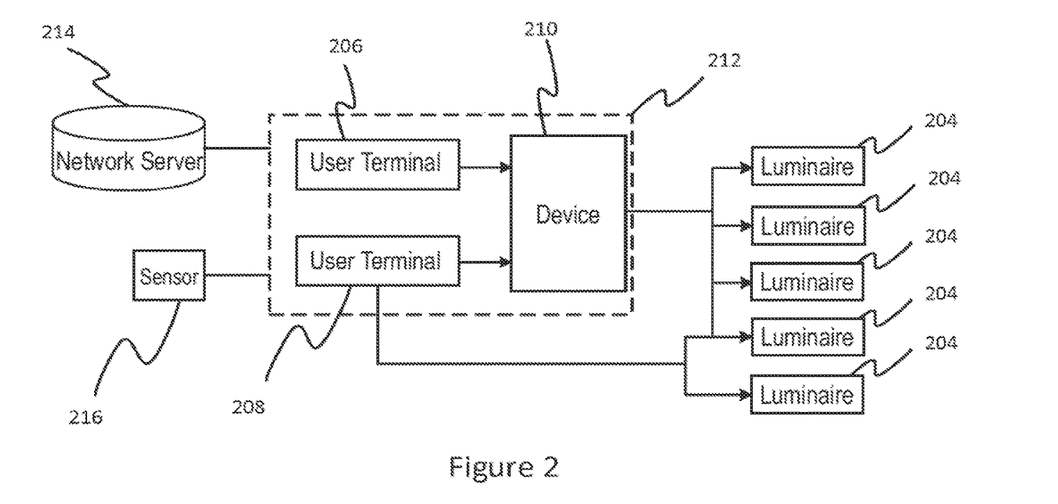
FIG. 2 illustrates a lighting system schematically.

Referring to FIG. 2, an example of a lighting system is shown schematically. A user terminal 206, connects to luminaires 204 via an intermediate device 210 such as a wireless router, access point or lighting bridge. User terminal 206 could for example be the wall panel 106 of FIG. 1, and the intermediate device could be integrated in the wall panel or provided as a separate device. User terminal 208 is a mobile user terminal, such as terminal 108 of FIG. 1, and may also connect to the luminaires via the device 210, but may additionally or alternatively connect to the luminaires directly without an intermediate device. Connection between the devices may be wired, using a protocol such as DMX or Ethernet, or wireless using a networking protocol such as ZigBee, Wi-Fi or Bluetooth for example. Luminaires may be accessible only via device 210, only directly from a user terminal, or both.

For instance the user terminal 206 may connect to the intermediate device 210 via a first wireless access technology such as Wi-Fi, while the device 210 may connect onwards to the luminaires 204 via a second wireless access technology such as ZigBee. In this case intermediate device 210 converts the lighting control commands from one protocol to another.

Device 210 and user terminals 206 and 208 comprise a functional group illustrated schematically by dashed line and labelled 212. This functional group may further be connected to a storage device or server 214, which may be part of a network or the Internet for example. Each element of the group 212 may include a memory, or have access to a storage function, which may be provided by storage device or server 214. Luminaires 204, or at least some of the luminaires 204, also include a memory.

This arrangement allows input of user commands at the user interface of a user terminal 206 or 208, and transmission of corresponding control signals to appropriate luminaires for changing illumination (e.g. recalling a specified scene).

Illumination settings can be created by a user by individually adjusting or programming parameter settings of luminaires. For example a user can manually adjust one or more luminaires in a room, via inputs at wall panel 106 perhaps, or even by using controls on a particular luminaire such as a lamp 104. Values of brightness and/or color can be altered, until the user is satisfied with the overall effect. The user can then input an instruction to a user terminal to store the current settings, and will typically assign a name or ID to the scene created. Illumination settings could also be obtained from an external source, such as the internet for example.

Illumination can also be controlled, or control can be augmented, by information gathered on environmental conditions in the vicinity of the system. Ambient light level for example can be used to automatically adjust the output of luminaires, or program certain settings. Time of day may also be used, as well as information on whether a person or persons are present, and possibly also the identity of that person(s), to control illumination output based on predetermined settings or values, or combinations of such settings or values. Such environmental conditions or information can be used by terminal 206 or 208, and/or device 210 to allow at least a degree of automation in controlling the output of luminaires 204. Automated control of settings can be augmented or overwritten by manual input if desired.

In embodiments, a sensor or sensor interface 216 provides information of sensed environmental information or inputs to one or more elements of the functional group 212. For example, sensors can include a light sensor, a PIR sensor, and/or an RFID sensor. A clock input for providing the current time of day can also be provided. Such sensors can be located in or around environment 102 of FIG. 1, and could be wall or ceiling mounted for example. In embodiments, sensors could be integrated into any or luminaires 104. Additionally or alternatively, terminals 206 or 208, or device 210 may include sensors to provide such information, particularly in the case of a mobile terminal in the form of a smartphone for example.

Figure 3:
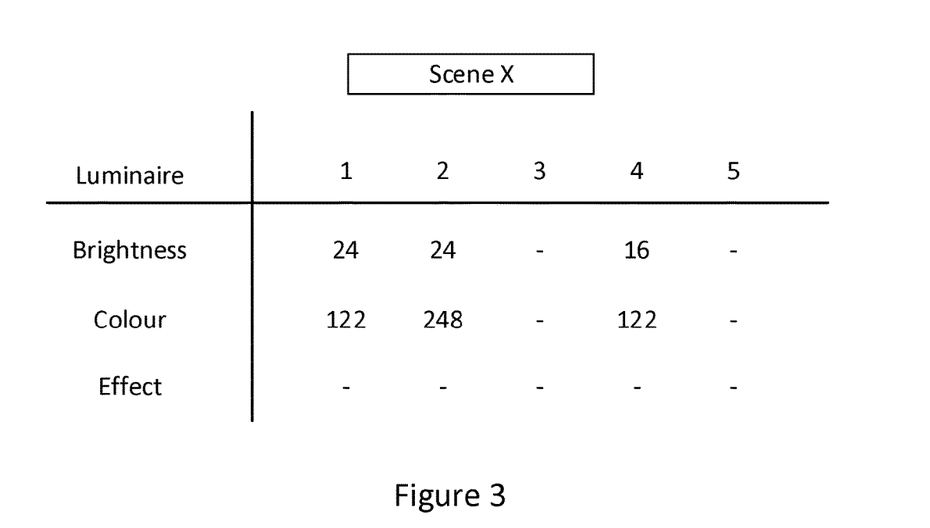
FIG. 3 illustrates data representing illumination setting for an example scene.

FIG. 3 illustrates data representing illumination settings for a given scene.

The data shows parameter values corresponding to different luminaires for a given scene. In this example, a lighting system includes five individually addressable luminaires, but the particular scene, say scene X, requires only three—numbers 1, 2 and 4. For each of these luminaires, a brightness value and a color value are provided. An effect value is an example of a possible further parameter which could be included, but which is not used in this example. Luminaires 3 and 5 are not used, and therefore parameter values are not included for these luminaires, for this scene.

Single numerical values of brightness and color are provided here as simplistic examples, but it will be understood that different embodiments may use different values or combinations of values to represent parameters. For example color could be represented by three values in RGB or L*a*b* color space.

In an example of a typical user operation for recalling a setting for use for example, the user may view a list of possible settings on a smartphone acting as a mobile user terminal 108. Using a touchscreen interface on the smartphone, the user can scroll and select a particular setting or scene identified by a name or ID.

Figure 4:
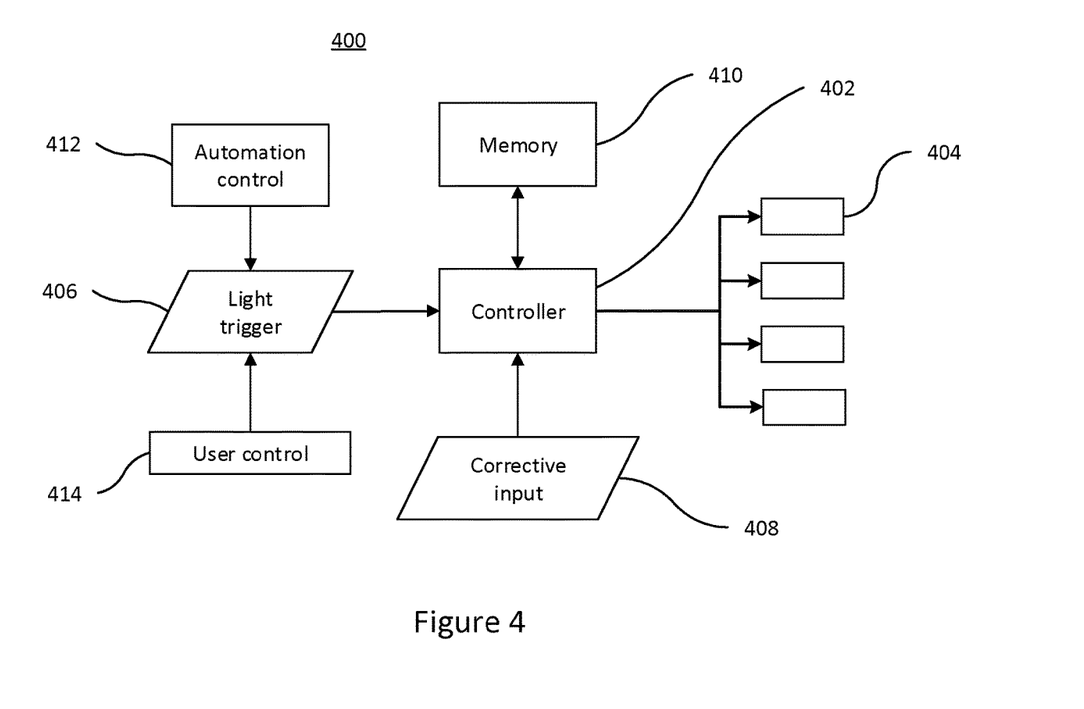
FIG. 4 shows a functional configuration of an example system for correcting illumination settings.

FIG. 4 shows a functional configuration of an exemplary semi-automated lighting control system.

A controller 402 receives inputs such as light trigger 406 and corrective input 408 (explained in greater detail below) and controls the outputs of luminaires 404 in response to such inputs. A memory 410 stores the immediately previous illumination setting, or equivalently the light output state of each luminaire 404 of the system prior to each change of illumination. This may be referred to as the "n−1" setting, with the current setting being the "n" setting. This may correspond to a predefined, identified, stored scene for example, but may instead be the result of individual changes made by a user. For example, if a stored scene is recalled, a user may then individually adjust one or more parameters of one or more luminaires used the scene. A user may turn on additional luminaires not included in the scene, and/or turn off luminaries which were previously included in the scene. These changes result in a "custom" illumination pattern, which is not (yet) stored with an identifier or name.

As a "current" setting is changed, memory 410 stores what was previously the current setting in a Last in First Out, stack type arrangement. The stack may be one deep, i.e. only storing the n−1 setting and overwriting this setting at each change of setting, but may also store two or more settings i.e.

the n−2 setting, n−3 setting etc. If the stack becomes full, the oldest setting or settings are overwritten first.

Memory 410 may be a particular memory location or address in a larger memory, used to store data such as that shown in FIG. 3, for particular stored scenes. Memory 410 may however be a separate, dedicated memory.

The memory 410 may store the actual illumination settings of each luminaire (such as brightness, color etc.) or may store control signals or instructions provided to the luminaries (such as a scene name or ID, or an instruction to increase or decrease a parameter such as brightness).

The controller is responsive to a light trigger, which is an input to change the current illumination settings. The light trigger can take a wide range of forms, as will be described in greater detail below, but will typically be based on either or both of an automation control 412 and a user control 414.

A user control is an input by a user to change light settings, by any of the means provided by a system, such as a wall panel, mobile user terminal or a switch or interface on a luminaire, in substantially the usual way. Such a user input may be intended or accidental.

Automation control refers to non-user initiated change of light settings. Automation control may result from the output of sensors, such as light sensors, motion sensors, thermal sensors, presence sensors etc., which may be located in the vicinity of the lighting system, or the space it illuminates.

For example, a light sensor can provide data on ambient light conditions—e.g. night, day, direct sunlight, overcast etc. and a light trigger can result by increasing illumination in darker conditions, or decreasing illumination in brighter conditions for example. A motion sensor or PIR sensor can monitor for presence or movement of a person for example, and detection of movement may trigger a light or lights to be turned on, or changed state. An RFID receiver may act as a presence sensor to detect and determine the ID of a person or object carrying or having an RFID tag or token. A trigger to change to a particular lighting setting may occur when a particular user is sensed in a space for example.

A clock or time input may also be used in providing automation control, optionally in combination with programmed or learned behavioral patterns, to learn the schedule and preferences of a user, such as circadian rhythms. For example, the lighting system can automatically be set to a "morning" setting at a specific time each day, or a setting may remain for a certain period of time after a user has left a space.

An interface with an external network or networks may also be used to provide automation control, for example inputs from the internet or a mobile cellular network such as GSM can trigger a change in lighting settings. IFTTT for example allows users to create strings of conditional statements triggered based on changes to other web services such as Facebook and Instagram.

Combinations of sensor inputs, time inputs, network inputs, user data preferences etc. can be combined using e.g. logic rules, to provide automation control which changes the illumination settings of the system without direct user input.

Corrective input 408 is an input to "undo" the previous change in light settings. The previous change may be based on automation control, user control, or a combination of both. Thus the corrective input is an instruction to set the previous setting stored in memory 410 (the "n−1" setting), in place of the current setting (the "n" setting). If more than one previous setting is stored ("n−2", "n−3") then repeated or successive undo inputs or instructions may access these further previous settings in turn. For example a single undo input goes back one setting (the "n−1" setting), while performing an undo input three times goes back three previous settings (the "n−3" setting).

Considering the above, it should be understood that the functions of the controller and the memory may be implemented in the same physical device or in different devices. The functions of the controller and the memory may be implemented in a single physical device such as a user terminal, such as 106 or 108 of FIG. 1, or 206 or 208 of FIG. 2, or an intermediate device such as 210 of FIG. 2.

Figure 5:
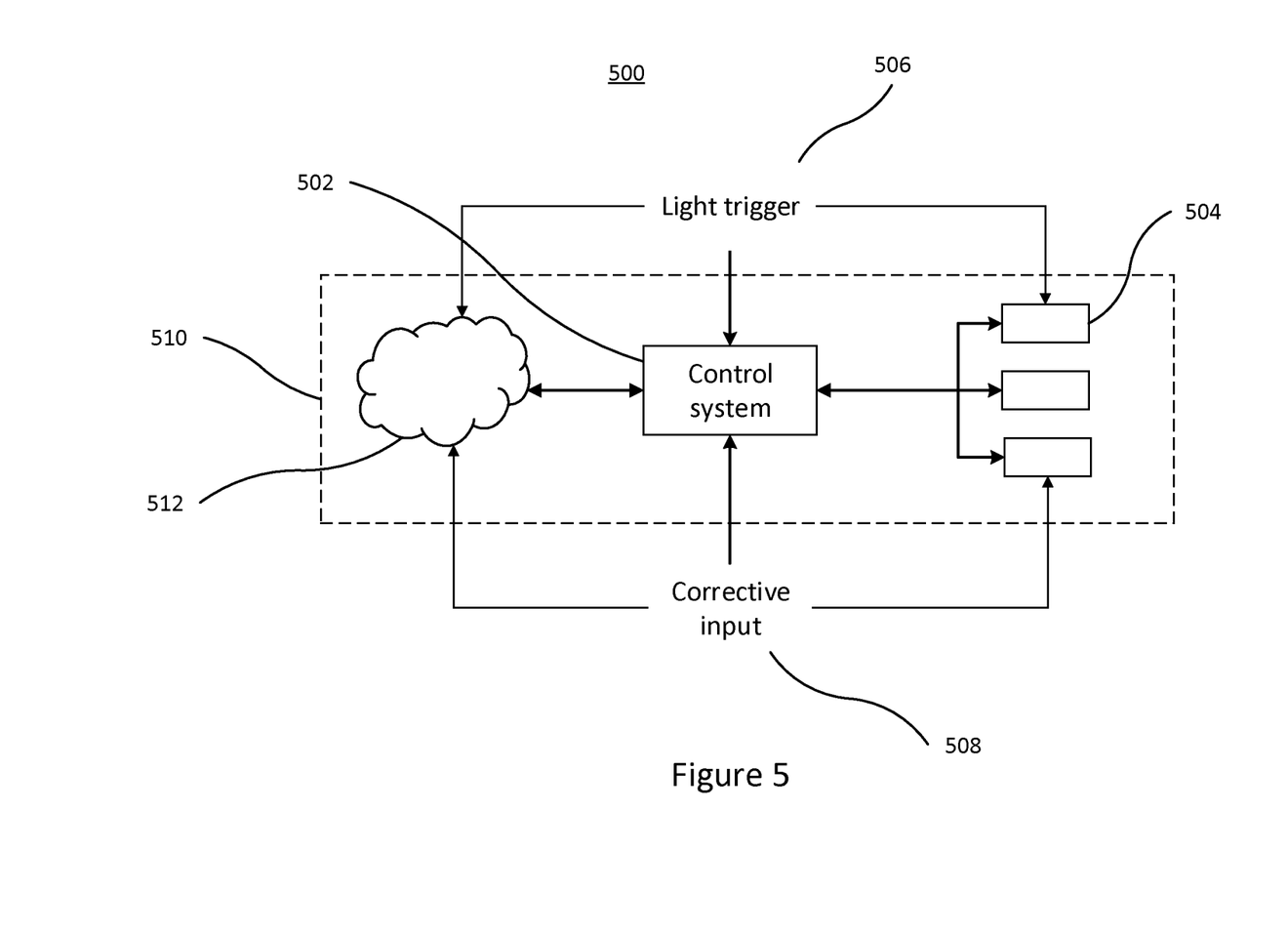
FIG. 5 shows an alternative configuration of an example system for correcting illumination settings.

Alternatively the functions may be distributed between such devices in a grouping such as 212 of FIG. 2, and some functions may additionally or alternatively be distributed to a network server 214 of FIG. 4. Accordingly, in one exemplary embodiment, the controller 402 is implemented in a mobile user terminal 208 of FIG. 2, and memory 410 is implemented in a lighting bridge acting as an intermediate device 210 of FIG. 2. Thus at a higher level an example lighting system can be illustrated generally as shown in FIG. 5. The lighting system is schematically represented as a control system 502 connected to luminaires 504, and also in communication with a network 512.

The control system in this example can be considered as the collaboration of functions operating locally to control the luminaires 504. Thus the control system may be embodied by one or more or all of functional group 212 of FIG. 2. In embodiments, a mobile device 208 acting as a user terminal can be considered to form part of the control system of FIG. 5, particularly in the case that communication between the mobile device and luminaires 504 enabled. However in other embodiments such a mobile device is instead considered as part of network 512 of FIG. 5. Control system 502 may include sensors, such as light sensors and motion sensors, and other sensor types mentioned above.

However, in some embodiments, some or all of the control functions for controlling luminaires 504 may be performed by the network, 512, passing control information to control system 502 acting as a client, to control luminaires 504.

Network 512 represents functions which may receive input from, or provide input to the control system 502. The network may for example comprise the internet or a mobile cellular network, and functions may be provided by servers or devices within the network or networks. Sensors as mentioned above may also operate at a network level and provide inputs the lighting system and control system 502 via the network.

Light trigger or triggers 506 serve substantially the same purpose as trigger 406 of FIG. 4. From FIG. 5, it can be seen that these triggers can be input to the lighting system via the control system 502, via luminaires 504 and/or via network 512. Light triggers perform the same function as in FIG. 4, of being an input or trigger to change the current illumination settings, either with or without a dedicated user input.

For example, a trigger could result from an online service such as IFTTT, represented by network 512, or may be from a user input at a luminaire 504. A conventional trigger of a user input to a part of the control system 502 is of course a further example.

Memory 510 is illustrated schematically by a dashed rectangle in FIG. 5, showing that the data of previous settings may be stored at any one of the luminaires 504, control system 502 or network 512, or a combination thereof.

Thus in one example, memory 510 runs in a device such as intermediate device 210 acting as part of a system control 502, which also receives the light commands/triggers and also is aware of the actual light state of the light sources.

Alternatively, the memory is implemented in a smartphone app where it can detect and store (previous) light changes effected from the app. A third option is that this module runs at an individual light source. In this case, it can keep track of the previous light setting for the light source. Finally, it could run in a cloud service that keeps track of the light settings.

For the case where the memory runs at an individual light source, a new command on the wireless interface could be used, to represent "undo" or "revert to a previous state" or "revert to the state of N minutes ago"—rather than the existing commands that set e.g. brightness. Such an undo command would effectively be similar to a command to revert to a stored scene, and could be multicast to all relevant luminaires substantially simultaneously.

Corrective input 508 serves substantially the same purpose as corrective input 408 of FIG. 4. Thus corrective input or inputs are able to change the current illumination settings to the previous, stored, illumination settings. From FIG. 5, it can be seen that these triggers can be input to the lighting system via the control system 502, via luminaires 504 and/or via network 512.

The corrective input is a user input, and can be performed on a variety of devices or user interfaces, such as a user terminal operating either as (or as part of) control system 502, or via a network 512, which may be in the form of a smart device such as a phone, tablet, watch or other wearable device. The corrective input may be performed on or at a dedicated lighting controller, such as a wall panel, operating as control system 502. A corrective input may further be made to a luminaire or lighting device 504 of the system, or a sensor providing information to the system. The sensor may form part of the control system 502, or be a networked device represented by 512.

Possible examples of corrective inputs include:

A tap or touch on a touch sensitive light source

A tap on a sensor device (for example the sensor which triggered the unwanted light effect)

A touch/deep press on a touch screen device (e.g. smartphone, watch or tablet)

A 'shake' of a smartphone or physical controller

A voice command (such as "no" or "undo" for example)

A key or button press on a control device, or a combination of key or button presses An action (such as a toggle action) on a power switch or controller of a lighting device.

A dedicated "undo" device or "undo" button or input on a device

Optionally, a time limit for the corrective action is defined to ensure that a corrective input is in response to a relatively recent light change. This may prevent an accidental correction to a light change to revert back to light state of a day or days ago for example.

Figure 6:
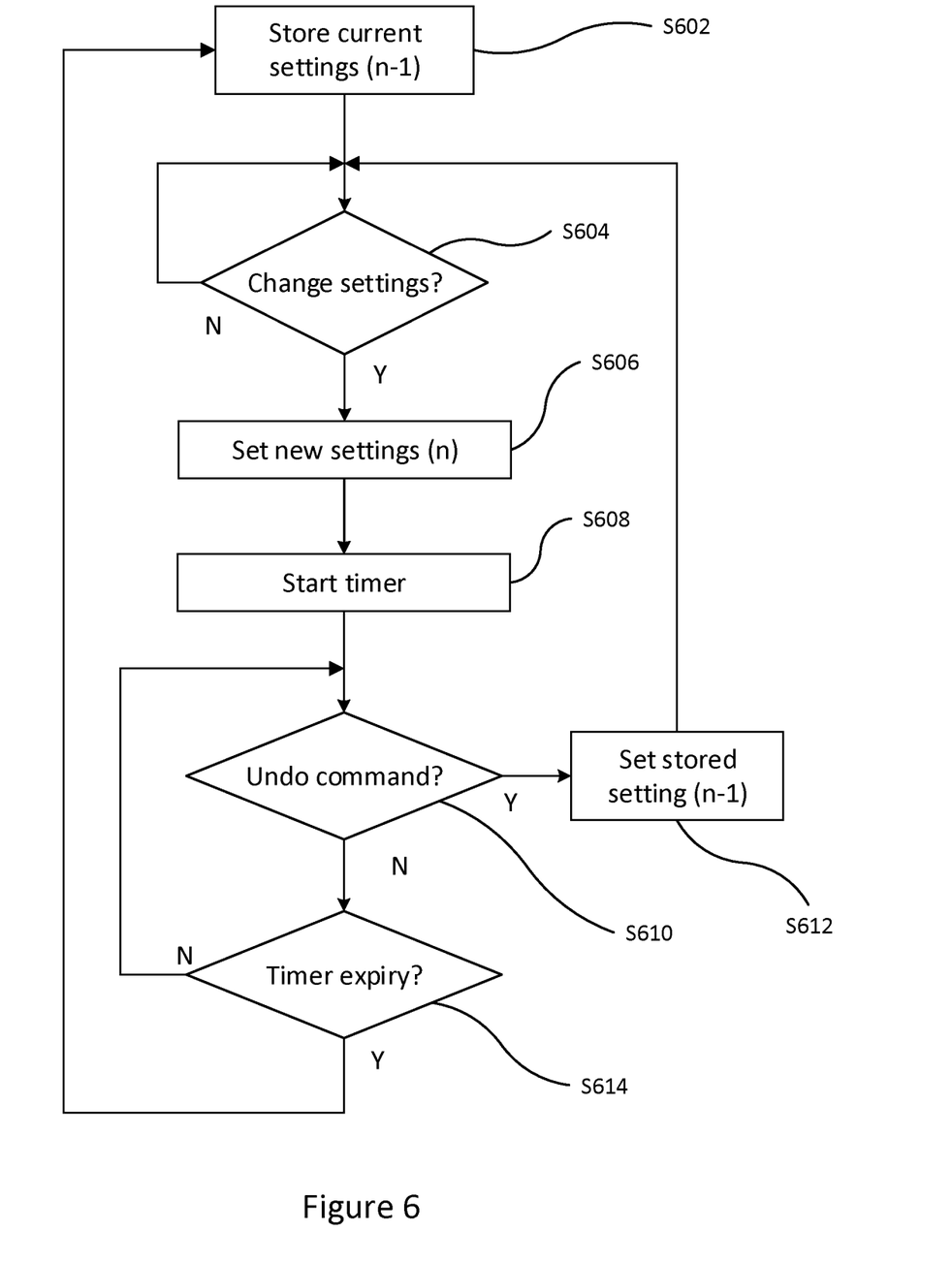
FIG. 6 is a flow diagram illustrating an example of a process for storing and reverting to previous settings.

FIG. 6 is a flow diagram illustrating an example correction process of a light setting.

A step S602, the current light or illumination settings are stored in a memory or memories. As noted above, this is referred to as the n−1 setting. The process of storing may write over a previously stored setting. In the case that only a single previous setting is stored (i.e. the memory stack is one deep) then the old value is simple replaced. In the case that multiple previous settings are stored (i.e. the memory stack is more than one deep), the oldest value is replaced.

At step S604, it is determined whether there is a change of light settings, i.e. whether a trigger event has occurred to change the light settings. A trigger event may be as described above with reference to FIGS. 4 and 5 for example. If a trigger has not occurred, or if a trigger has occurred but it does not result in a change of light settings, the process returns to wait for a change of settings. If a change of settings does result ("yes" to step S604) then at step S606 the new settings are applied to the luminaires such as luminaires 404 or 504 of FIGS. 4 and 5.

Optionally at step S608, a timer is initiated. This timer sets a period within which an undo command can be instructed, to return to the previous light settings. The time period may be a fixed period of, say, 5 seconds or 10 seconds. Alternatively, the time period could depend on the trigger and/or the current settings, and different combinations of triggers and settings could give rise to different time periods. For example, a trigger corresponding to a user input could have a shorter time period, while a trigger which is the result of an automation process could have a longer time period.

Furthermore, the timer could depend on the manner of the corrective action. An action to undo input to a mobile device such as a smartphone may have a longer timer value, and an action to undo input at a wall switch may have a shorter time value.

A corrective input may be input using an action which ordinarily performs another function. A wall switch may usually turn a particular luminaire of the system on or off for example. However, after a change of setting caused by a system component other than that switch, the function of the switch may be changed to an "undo" input. The changed function of the switch may last for the period of the timer, before the switch reverts back to its normal function.

At step S610 it is determined whether an undo command has been input. If an undo command has been input, the previous (n−1) settings are applied at step S612. The settings can be read out of the memory, and, if the memory is not at the luminaires themselves, communicated to the luminaires. The process then returns to step 604 to wait for a trigger to change settings, as the previous settings are already stored.

If no undo command is received or detected at step S610, the process advances to step S614. Here it is determined whether the timer has expired. If the time has not yet expired, the process returns to S610 to wait for a possible undo command. If the timer has expired (and no undo command has been received) then the process returns to step S602, and the current setting (n) is stored as the previous setting (n−1), and the process begins again.

Optionally, the "undo" corrective action is applied to those luminaires in the vicinity of a user. For example, in a case where a user make a change to lighting settings in a room in which he or she is located, an automated light action in another room follows shortly afterwards. Then the "undo" corrective action would be intended to be applied to the room where the user is located—even though this is not the last light action performed in the system. Therefore the system may be able to monitor for the presence of a user in embodiments. If a user input is to a luminaire or wall panel for example, this can provide a sufficient indication. Alternatively a user's position can be monitored by the location of a tag or token which is carried by the user, which could be a smartphone, or by a camera using person and/or face recognition for example. Other methods are possible.

Some specific examples are provided to illustrate various possible scenarios:

In the evening, a user has manually set a specific scene for reading in his living room. After leaving the room briefly, he walks back into a room and a PIR sensor triggers a lamp to switch on a dimmed sunset scene. The user doesn't want that and presses the wall switch. The system returns to the previous state (specific set scene for reading).

As a second example, a user has connected a particular luminaire such as a table lamp to an IFTTT event. Every time he or she is tagged in a Facebook message, the table lamp will turn blue. However, he is having a romantic dinner and uses a candle effect setting on the table lamp. During the dinner, the table lamp turns blue due to an IFTTT event triggered by a Facebook post). The user can tap on the (touch sensitive) table lamp, and this input corresponds to an undo input to return the table lamp to the candle effect setting.

Finally, in an example, a user has created a particular lighting scene in an app running on a smartphone or smartwatch say. He or she is trying to do some fine-tuning of individual settings on individual luminaires say, but then makes a change he or she regrets. Shaking the smartphone corresponds to an undo input in this example, and allows the user quickly and easily to control the lights to revert back to the previous scene state.

The corrective action or actions of a user can be used by the system to change automated or semi-automated light setting and illumination changes in future. A learning module (which may be a software module) can be provided which registers the corrective actions of a user for this purpose. The system may automatically update a user schedule, or threshold value, or logic rule for example. Alternatively, the system may suggest such a change as a prompt for a user, and a user may provide an input to accept or decline the proposed change.

For example, if a user always corrects a scheduled scene change at 20:00, the system might prompt the user with the question whether he wants to keep the schedule light change, adapt the timing and/or light change or even remove this item from the schedule altogether. In addition to the corrective action, contextual parameters (e.g. user id, time of day, ambient light level, number of people present in the room, etc.) at the time of corrective action might be stored as well in order to better predict in which situations users correct particular light changes, e.g. an automatic "romantic dinner" scene recall for the dinner table is may be set when multiple persons are present at the table but may be "undone" by an individual eating alone (the corrective action occurs only when person is eating alone but not when multiple persons are present). This can be registered by the system, and can lead to suggested or automatic fine tuning of the triggers for this particular scene (in this example: the automatic recall of the "romantic dinner" gets an additional condition: only when multiple persons are present).

In certain cases, rules or logic governing automated lighting changes may be recursive, or involve a state or memory. For example, a sequence of progressively dimmer settings may be successively applied by an automation rule every ten minutes after 11 μm, reducing the brightness by 10% each time. In such cases, a corrective input can reset or readjust the state of the automation process. In the above example, if the light level is reduced from 80% to 70% after a ten minute interval, and a user corrects this change to return to 80%, when the next ten minute interval occurs, the light level is reduced to 70%, and not to 60% following the original sequence of the automation rule.

In embodiments, a corrective input may stop or suspend, partially or completely, an automatic change in lighting in response to a trigger event. For example, after a corrective action is instructed, the system does not make any further automated lighting changes for a fixed period of time, such as five or ten minutes for example. The stopping or suspension of automated changes may be specific to certain triggers. In another example, if a presence sensor triggers a lighting change, which is subsequently "undone", then that sensor is suspended from triggering any further changes in lighting for a period of time, such as 15 or 30 minutes.

The period for which the system or a certain part of the system is suspended may be increased in response to further "undo" operations. For example, if a particular sensor is suspended from triggering changes for 30 minutes after a corrective input, if a further corrective input is performed, then that sensor is suspended for 1 hour. The period may be reset after a predetermined time, such as 12 hours, or may be reset each day for example.

As discussed, in examples the memory may store more than one previous light setting, and may store multiple settings corresponding to periods of time extending into the past. In such examples, a user correction input, or undo command, can be more than a binary "on/off" input. In such examples, a user can input a correction command to revert to a previous lighting setting, but the command can include an indication of a time period to determine which previous setting (of more than one previous stored setting) to revert to.

For example a user can indicate a time period, such as 10 minutes ago, 24 hours ago etc. Alternatively a user can specify a time and/or date, such as Thursday, 2 pm. A further option is for a user to select the number of past settings, or equivalently changes of lighting settings, to cycle through (i.e. the depth in the memory stack corresponding to n−1, n−2 etc.) In this case a user input could specify to go back 3 settings or five settings for example.

The above description has been primarily directed to lighting (or illumination) and lighting settings, in the context of a "connected lighting" system. Such a lighting system may be part of a broader "connected home" or "automated office" system, including components such as blinds, fans, heating and cooling and A/V systems. Such components also have settings for various parameters (e.g. position, speed, temperature, volume channel ec) and previous settings of those parameters can be stored in a memory, in an analogous fashion to that described above. Therefore, a user correction input may revert not only light settings, but also settings of other components connected to the controller or control system.

It will be understood that the present invention has been described above purely by way of example, and modification of detail can be made within the scope of the invention. Each feature disclosed in the description, and (where appropriate) the claims and drawings may be provided independently or in any appropriate combination.

The various illustrative logical blocks, functional blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the function or functions described herein, optionally in combination with instructions stored in a memory or storage medium. A described processor, such as controller 402 or control system 502 may also be implemented as a combination of computing devices, e.g., a combination of a DSP and a microprocessor, or a plurality of microprocessors for example. Conversely, separately described functional blocks or modules may be integrated into a single processor. The steps of a method or algorithm described in connection with the present disclosure, such as the method illustrated by the flow diagram of FIG. 6, may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, and a CD-ROM.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting control system, comprising:
a controller configured to control one or more lighting devices for providing illumination of a space; and
a memory configured to store at least a first light setting for said one or more lighting devices in a last in, first out arrangement;
wherein the controller is configured to cause an automatic change from the first light setting to a second light setting in response to a detected trigger event without any user input, and wherein the controller is further configured to restore the first light setting, having been stored in the memory, in response to a corrective user input made to said at least one lighting device of said one or more lighting devices,
wherein said controller is configured to restore the first light setting in response to said corrective user input only if said corrective user input is made within a set time period from the change from the first light setting to the second light setting, wherein a duration of the set time period is set based on a type of the detected trigger event from a plurality of different types of trigger events with each type of trigger event of the plurality of different types of trigger events having a different set time period to receive the corrective user input.

2. The system according to claim 1, wherein a length of the set time period is set depending on at least one of the trigger event, the first light setting, the second light setting, the time and/or date, and the manner of the corrective user input.

3. The system according to claim 1, wherein the system includes a user input interface, configured to accept the corrective user input, and wherein the controller is configured to restore the first light setting in response to a given input to said user input interface, for the duration of the set time period from said automatic change, and wherein the controller is configured to perform a different lighting control function in response to said given input, outside of said set time period.

4. The system according to claim 1, wherein the corrective user input is an input through a switch of said one or more lighting devices.

5. The system according to claim 1, wherein said controller is configured to register the corrective user input, and to update a response to the trigger event to change said light settings, based on a registered corrective user input.

6. The system according to claim 5, wherein said control system is configured to provide an output to a user indicating an update to the response to the trigger event, and prompts a user to input whether or not to accept said update.

7. The system according to claim 1, wherein the set time period has a first length set depending on at least one of the trigger event, the first light setting, the second light setting, the time and/or date, and the manner of the corrective user input and a second length set depending on at least one of the trigger event, the first light setting, the second light setting, the time and/or date, and the manner of the corrective user input, where the first and second lengths are different.

8. The system according to claim 1, wherein the duration of the set time period is determined based on the type of the detected trigger event and at least one light setting of the one or more lighting devices.

9. The system according to claim 1, wherein the duration of the set time period is determined based on a manner of the corrective user input.

10. The system according to claim 1, wherein a timer is initiated in response to the change from the first light setting to the second light setting.

11. The system according to claim 1, wherein a function of a user interface is reassigned to correspond to the corrective user input made to said at least one lighting device of said one or more lighting devices.

12. A method of controlling a lighting system including one or more lighting devices for providing illumination of a space, the method comprising:
detecting a trigger event without any user input and automatically switching said one or more lighting devices from a first lighting setting to a second lighting setting in response to said trigger event;
storing the first lighting setting for said one or more lighting devices in a last in, first out arrangement;
detecting a corrective user input made to the one or more lighting devices;
determining a time period between said trigger event and said corrective user input; and
restoring said first lighting setting in response to detecting said corrective user input if it is determined that said determined time period is less than or equal to a predetermined threshold, wherein a duration of the determined time period is set based on a type of the detected trigger event from a plurality of different types of trigger events with each type of trigger event of the plurality of different types of trigger events having a different determined time period to receive the corrective user input.

13. The method according to claim 12, wherein a duration of the determined time period is determined based on the trigger event.

14. The method according to claim 12, wherein a duration of the determined time period is determined based on a manner of the corrective user input.

* * * * *